(12) United States Patent
Keohane et al.

(10) Patent No.: US 7,269,739 B2
(45) Date of Patent: Sep. 11, 2007

(54) METHOD AND SYSTEM FOR ALLOWING FOR THE SECURE TRANSMISSION AND RECEPTION OF DATA IN A PROCESSING SYSTEM

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/159,511

(22) Filed: May 30, 2002

(65) Prior Publication Data

US 2003/0226008 A1     Dec. 4, 2003

(51) Int. Cl.
*G06F 11/30* (2006.01)
(52) U.S. Cl. .................................................. 713/189
(58) Field of Classification Search ............... 713/150, 713/189, 190
See application file for complete search history.

(56) References Cited

U.S. PATENT DOCUMENTS

| | | | | |
|---|---|---|---|---|
| 5,185,797 A | * | 2/1993 | Barrett et al. ............... | 380/274 |
| 5,825,878 A | * | 10/1998 | Takahashi et al. .......... | 713/190 |
| 6,003,117 A | * | 12/1999 | Buer et al. .................. | 711/163 |
| 6,523,118 B1 | * | 2/2003 | Buer .......................... | 713/189 |
| 2002/0138761 A1 | * | 9/2002 | Kanemaki et al. .......... | 713/201 |

* cited by examiner

*Primary Examiner*—Emmanuel L. Moise
*Assistant Examiner*—Ali Abyaneh
(74) *Attorney, Agent, or Firm*—Sawyer Law Group LLP

(57) ABSTRACT

A method and system for allowing for the secure transmission and reception of data in a processing system is disclosed. The method and system includes providing at least one crypto algorithm in a region of a system memory in the processing system; and assigning a cryptographic function of the at least one crypto algorithm to the region. A system and method in accordance with the present invention ties the encryption/decryption algorithm to specific DMA regions and the encryption key to the particular DMA transfer. This allows the system processors to offload the encryption and enable all network (and non-network) adapters to take advantage of this offload without hardware changes to the adapters.

16 Claims, 5 Drawing Sheets

US 7,269,739 B2

METHOD AND SYSTEM FOR ALLOWING FOR THE SECURE TRANSMISSION AND RECEPTION OF DATA IN A PROCESSING SYSTEM

FIELD OF THE INVENTION

The present invention relates generally to processing and particularly to a processing system which includes cryptography.

BACKGROUND OF THE INVENTION

Currently cryptography is used to securely transmit and receive data within a network. The problem is that encrypting and decrypting data requires a large number of processor cycles, therefore slowing the entire performance of the processing system. The trend has been to off load the crypto engines onto the network adapters or have specialized non-network crypto adapters.

The problem with specialized network crypto adapters is that they are currently tied to a specific protocol and they require the replacement of existing hardware, i.e., the existing non-crypto network adapter. The problem with using specialized non-network crypto-adapters is that the data must cross the bus two extra times. The network adapter brings the data into system memory, but the system must push the data out to the specialized crypto adapter and bring back the encrypted/decrypted result back.

Accordingly, what is needed is a system and method that overcomes the above-identified problems. The system and method should be cost effective, easy to implement, and adaptable to existing processing systems. The present invention addresses such a need.

SUMMARY OF THE INVENTION

A method and system for allowing for the secure transmission and reception of data in a processing system is disclosed. The method and system includes providing at least one crypto algorithm in a region of a system memory in the processing system; and assigning a cryptographic function of the at least one crypto algorithm to the region.

A system and method in accordance with the present invention ties the encryption/decryption algorithm to specific DMA regions and the encryption key to the particular DMA transfer. This allows the system processors to offload the encryption and enable all network (and non-network) adapters to take advantage of this offload without hardware changes to the adapters.

DETAILED DESCRIPTION

The present invention relates to generally to processing and particularly to a processing system which includes cryptography. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
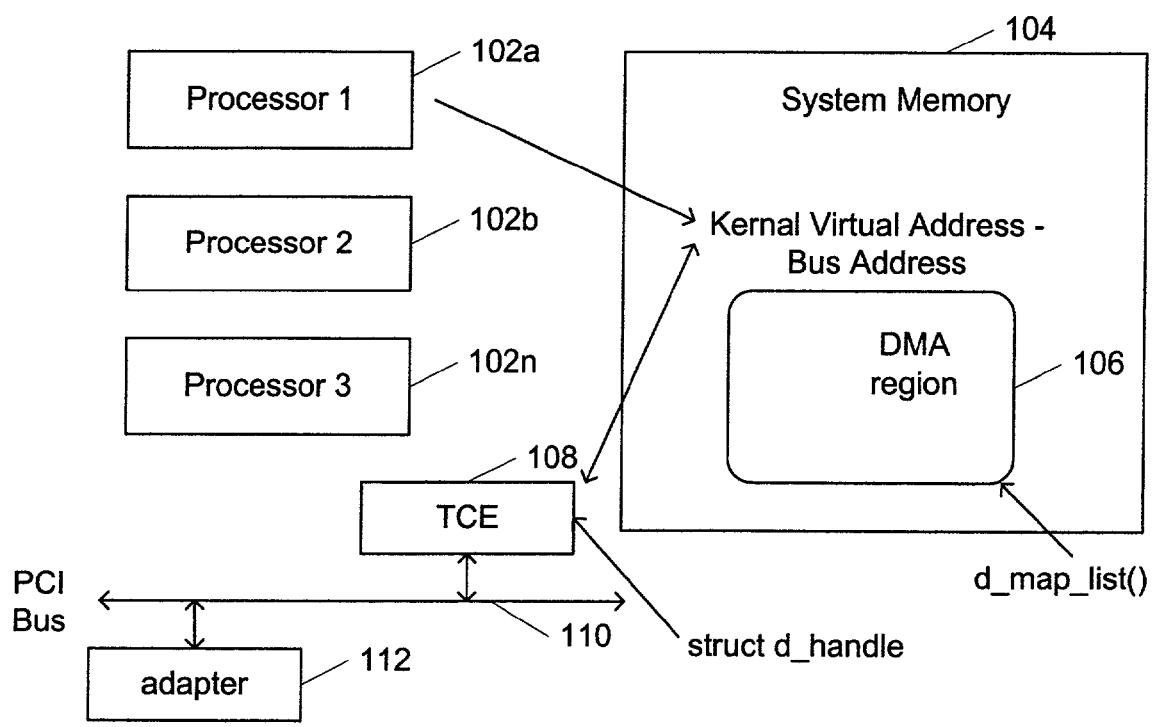
FIG. 1 is a generalized diagram of a conventional processing network.

FIG. 1 is a generalized diagram of a conventional processing network 100. The network processing system 100 includes a plurality of processors 102a-102n which access a system memory 104. The system memory 104 includes a direct memory access (DMA) region 106 in which a kernel virtual address and corresponding bus address within the memory 104 are translated by a transaction control entry (TCE) system 108. The TCE system 108 is coupled to the bus 110 (in this case a PCI bus 110). An adapter 112 is coupled to the bus 110.

KVA—Bus Address and TCEs

In the conventional network processing system 100, a kernel virtual address (KVA) and a bus address point to the same physical memory. The difference is that KVA provides addressability to this memory for a processor 102, while the bus address provides addressability for the adapter 112. TCE system 108 translates the bus address into a physical address.

There are two main kernel services that set up access to the DMA region:

1. The first kernel service, D_init (also referred to as struct d_handle), returns a D-handle structure. The D-handle structure describes the bus as it relates to the adapter.

2. The second kernel service, D_map_list(), maps the kernel memory attached user space address (KVA) to a bus address to be used by the adapter.

As before mentioned, the trend has been to off load the crypto engines onto the network adapters or have specialized non-network crypto adapters. The problem with specialized network crypto adapters is that they are currently tied to a specific protocol and they require the replacement of existing hardware, i.e., the existing non-crypto network adapter 112.

The problem with using specialized non-network crypto adapters is that the data must cross the bus 110 two extra times. The network adapter 112 brings the data into system memory, but the system must push the data out to a specialized crypto adapter and bring back the encrypted/decrypted result back.

A system and method in accordance with the present invention ties the encryption/decryption algorithm to specific DMA regions and the encryption key to the particular DMA transfer. This allows the system processors to offload the encryption and enable all network (and non-network) adapters to take advantage of this offload without hardware changes to the adapters.

For example, the AIX and RS6000 processing systems support a DMA subsystem that is a combination of kernel services and hardware that employ the same services that any DMA subsystem must use to achieve the goal of allowing a bus attached to the device direct access to system memory without use of the system processors. The fundamental premise of this architecture, which is to offload the processor of having to process the data transfer from the adapter to system memory, lends itself perfectly to also offload the cryptography in the same manner.

Figure 2:
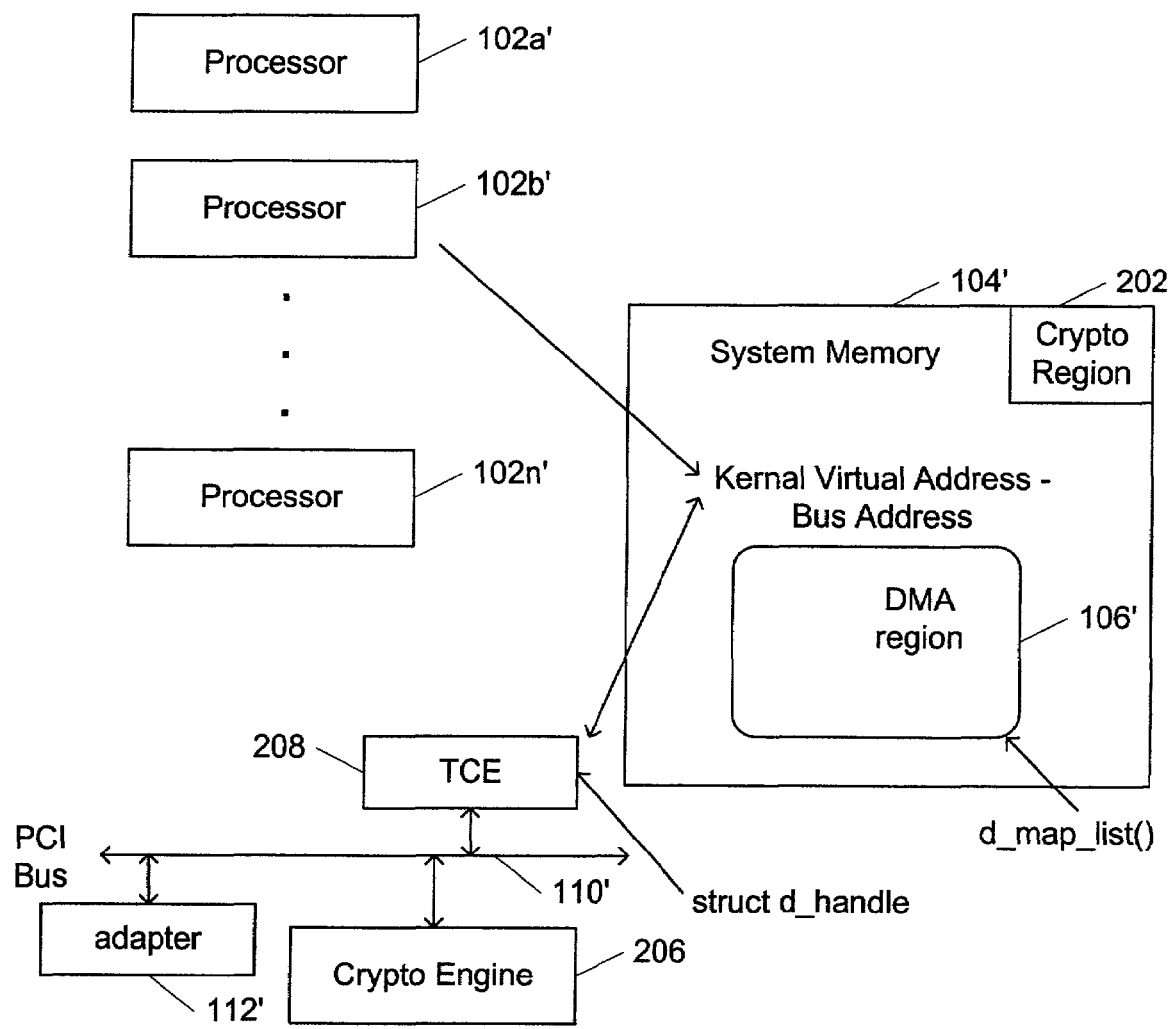
FIG. 2 illustrates a network processing system in accordance with the present invention.

For a more detailed description of the present invention, refer now to the following description in conjunction with the accompanying figures. FIG. 2 illustrates a network processing system 200 in accordance with the present invention. The system 200 has similar elements to those described with respect to the system 100 of FIG. 1. The system 200 utilizes the two main in kernel services (i.e., struct_d_handle and D_map_list) of the conventional system and adds a crypto-memory region 202 to enable cryptography. The system also includes a crypto-engine 206 for enabling cryptography in the system 200. The TCE system 208 in addition to translating addresses for other purposes also translates data associated with the crypto memory region 202.

Operation of DMA Cryptogaphy

Figure 3:
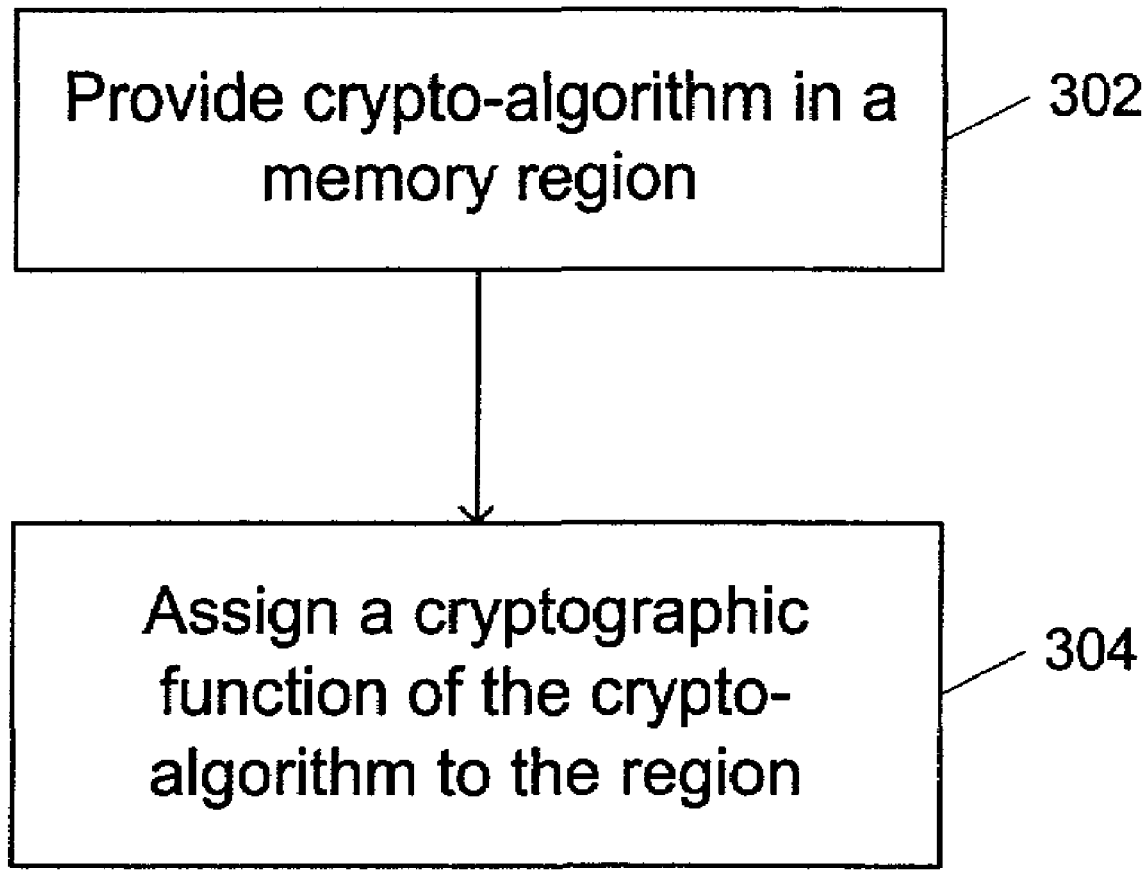
FIG. 3 is a flow chart of enabling cryptography in accordance with the present invention.

A system and method in accordance with the present invention builds upon the existing DMA kernel services, to enable cryptography during the DMA data transfer and thus avoid processing cycles from the computer's CPUs. FIG. 3 is a flow chart of enabling cryptography in accordance with the present invention.

First, at least one crypto algorithm is provided in a region of a system memory in the processing system via step 302. Next, a cryptographic function of the at least one crypto algorithm is assigned to the region, via step 302. In so doing, cryptography is enabled in the system.

Figure 4:
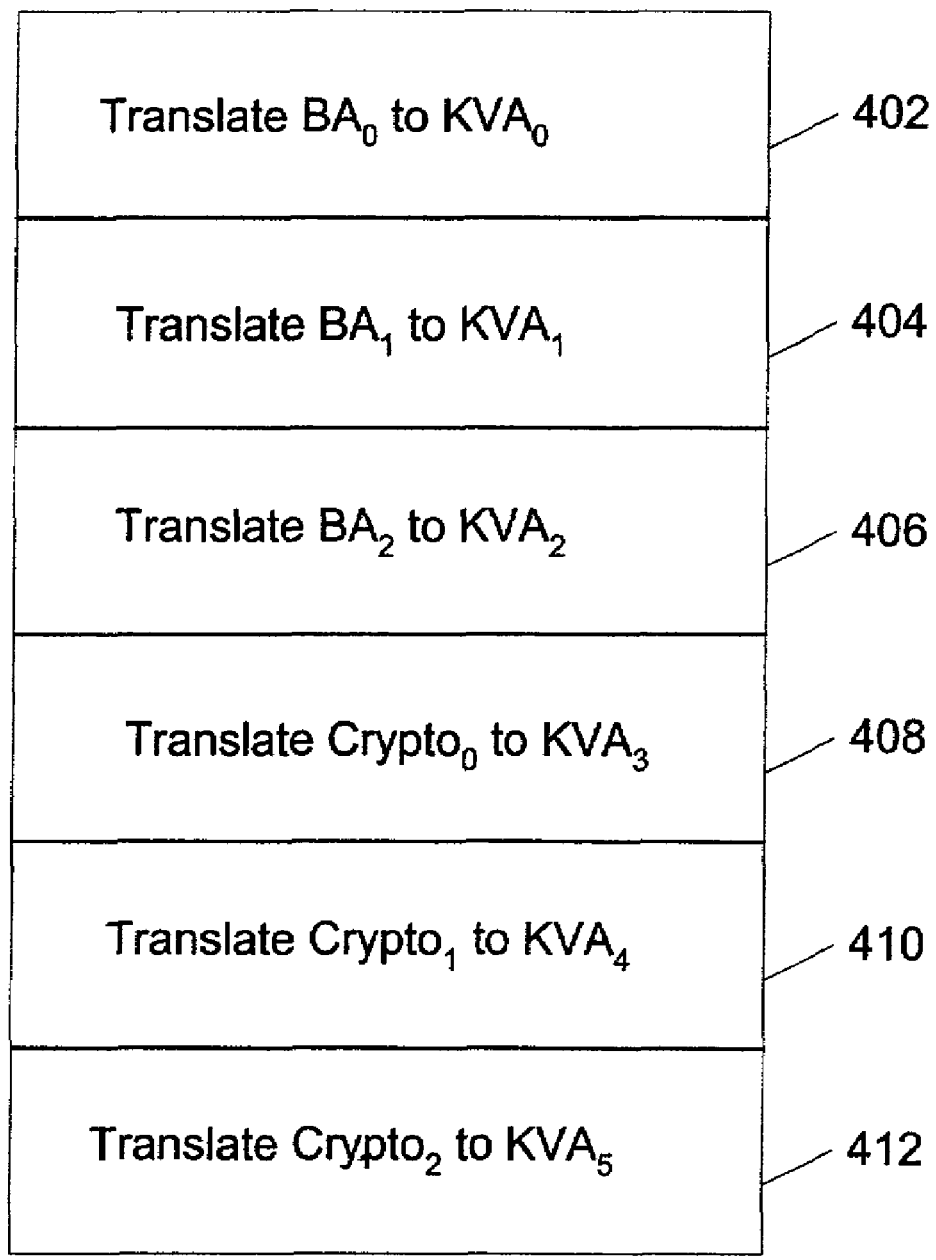
FIG. 4 illustrates a TCE table in accordance with the present invention.

For a further description of the features of the present invention, refer now to the following. As before mentioned, a first kernel service D_init returns a structure with function pointers specific to the bus type used by the adapter. The service includes cryptography function also used by this adapter. The adapter, for example, divides or otherwise has multiple DMA sub-regions, and the adapter can then assign unique cryptographic functions to each region utilizing a TCE table. FIG. 4 illustrates a TCE table 400 in accordance with the present invention. The TCE table 300 translates the bus addresses 402-406 to associated KVAs. In addition, the TCE table 300 translates cryptography addresses 408-412 to associated KVAs related to the crypto-memory region within the system memory.

Again, as before mentioned, a second kernel service (D_map_list) binds a memory region to a bus address. With a system and method in accordance with the present invention, the second kernel service will also be passed a cryptographic key that can be used by the cryptographic algorithm associated with this memory region. For example, an application will write to an adapter, and a device driver within the TCE 108 will attach the application's user address space to the kernel and the second kernel service will map this space to a bus address understood by the adapter.

DMA Crypto Hardware

In a preferred embodiment, the crypto engine 206 (FIG. 2) is associated with the TCE system 208. As is well known, the TCE system 208 is the gatekeeper for the DMA transfers. The TCE system 208, therefore, lends itself to the extension of a crypto engine. As the DMA data passes through the TCE system 208, and if the crypto engine is set up, the data is encrypted or decrypted as it is written into the system memory or read from system memory, via the TCE system 208. Thus the crypto engine 206 folds cryptography into the existing DMA system in a seamless manner.

Figure 5:
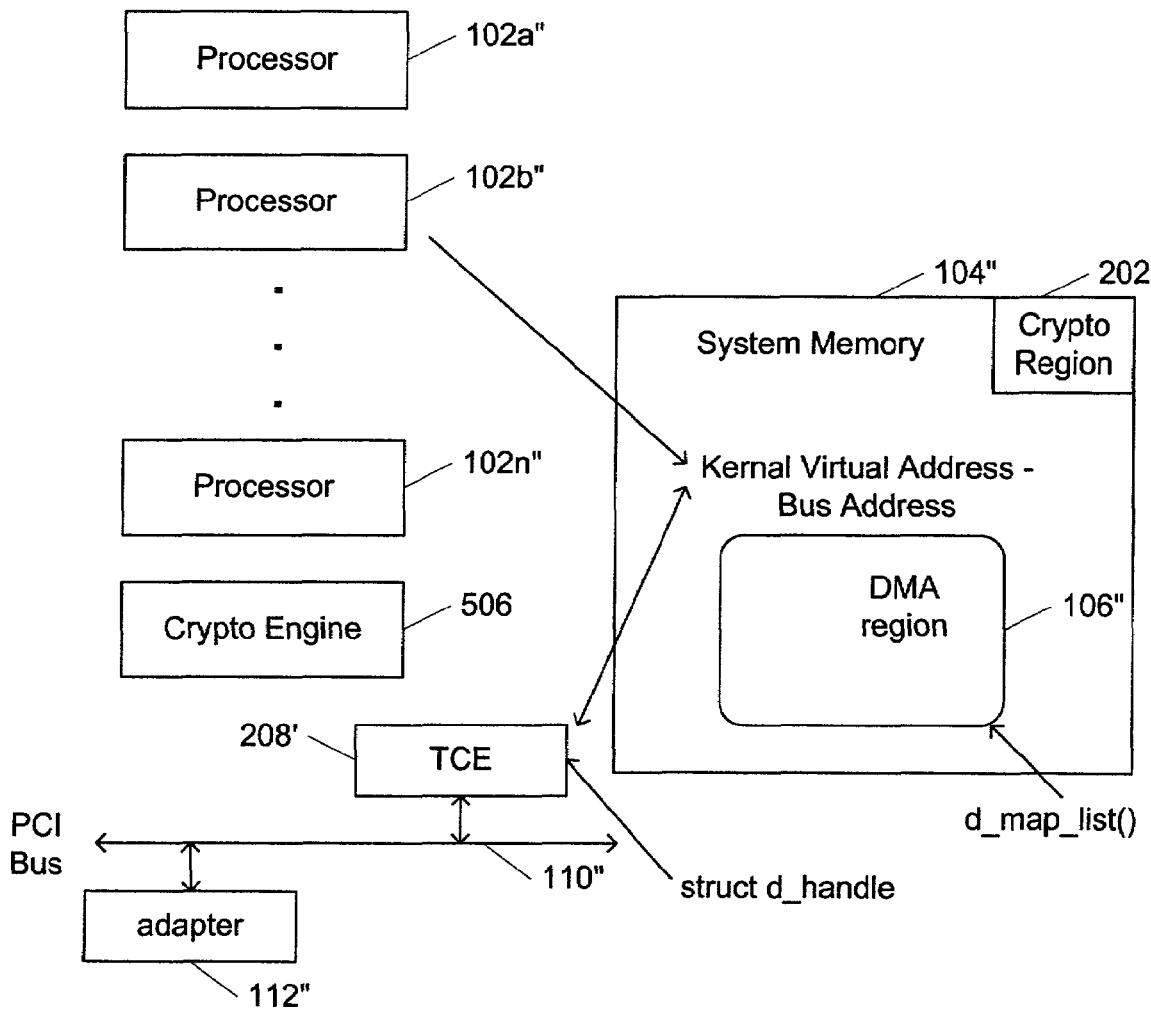
FIG. 5 illustrates a second embodiment of a network processing system in accordance with the present invention.

The crypto engine 206 can be an adapter that communicates with the TCE system via the bus as shown in FIG. 2 or it could be a separate processor 506 shown in FIG. 5 which can access the crypto memory region 202 directly.

A system and method in accordance with the present invention ties the encryption/decryption algorithm to specific DMA regions and the encryption key to the particular DMA transfer. This allows the system processors to offload the encryption and enable all network (and non-network) adapters to take advantage of this offload without hardware changes to the adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing for a secure transmission and reception of data in a processing system, the method comprising:
   providing at least one crypto algorithm in a region of a system memory in the processing system;
   assigning a cryptographic function of the at least one crypto algorithm to the region;
   translating a bus address into a physical address for the region in the system memory using a transaction control entry (TCE) system; and
   associating a crypto-engine with the TCE system to enable cryptography during a direct memory access (DMA) of the region in the system memory.

2. The method of claim 1, wherein providing at least one crypto algorithm comprises:
   assigning a region in the system memory for cryptography; and
   providing a plurality of crypto algorithms in the region.

3. The method of claim 2, wherein assigning a cryptographic function comprises:
   dividing the region into multiple subregions; and
   assigning a unique cryptographic function in the plurality of crypto algorithms to each of the subregions.

4. A networking processing system comprising:
   at least one processor;
   a system memory coupled to the at least one processor, the system memory including a region for storing at least one cryptographic algorithm;
   a bus;
   a transaction control entry (TCE) system coupled between the bus and the system memory for translating a bus address into a physical address for the region; and
   a crypto engine associated with the TCE system for enabling cryptography during a direct memory access (DMA) of the region.

5. The networking processing system of claim 4, wherein the crypto engine comprises an adapter coupled to the bus.

6. The networking processing system of claim 4, wherein the crypto engine comprises a processor which accesses the region via the TCE system.

7. The networking processing system of claim 5, wherein when cryptography is enabled, a first kernel service and a second kernel service are utilized,
   the first kernel service returns a structure with function pointers that are specific to a cryptography function used by the adapter, and the second kernel service maps a virtual address of the region to a bus address.

8. The networking processing system of claim 7, wherein the second kernel service also passes a cryptographic key to be used by the cryptographic algorithm.

9. A direct memory access (DMA) subsystem for a system memory comprising:
   a transaction control entry (TCE) system for translating a bus address into a physical address for a region in the system memory, the region for storing at least one cryptographic algorithm; and
   a crypto-engine associated with the TCE system for enabling cryptography during a direct memory access (DMA) of the region.

10. The DMA subsystem of claim 9, wherein the crypto engine comprises an adapter coupled to the bus.

11. The DMA subsystem of claim 10, wherein when cryptography is enabled, a first kernel service and a second kernel service are utilized,
   the first kernel service returns a structure with function pointers that are specific to a cryptography function used by the adapter, and
   the second kernel service maps a virtual address of the region to a bus address.

12. The DMA subsystem of claim 11, wherein the second kernel service also passes a cryptographic key to be used by the cryptographic algorithm.

13. The DMA subsystem of claim 9, wherein the crypto engine comprises a processor which accesses the region via the TCE system.

14. A computer readable medium containing a computer program for allowing for a secure transmission and reception of data in a processing system, the computer program comprising program instructions for: Providing at least one crypto algorithm in a region of a system memory in the processing system; assigning a unique cryptographic function of at least one crypto algorithm to the region; translating a bus address into a physical address for the region in the system memory using a transaction control entry (TCE) system; and associating a crypto-engine with the TCE system to enable cryptography during a direct memory access (DMA) of the region in the system memory.

15. The computer readable medium of claim 14, wherein providing at least one crypto algorithm comprises:
   assigning a region in the system memory for cryptography; and
   providing a plurality of crypto algorithms in the region.

16. The computer readable medium of claim 15, wherein assigning a cryptographic function comprises:
   dividing the region into multiple subregions; and
   assigning a unique cryptographic function in the plurality of crypto algorithms to each of the subregions.

* * * * *